(12) United States Patent
Chen et al.

(10) Patent No.: US 11,161,451 B1
(45) Date of Patent: Nov. 2, 2021

(54) VEHICLE HEADLIGHT WITH INFRARED SPOTLIGHT, AUTOMATIC HEIGHT ADJUSTMENT, AUTOMATIC HEIGHT ADJUSTING METHOD

(71) Applicant: HASCO VISION TECHNOLOGY CO., LTD., Shanghai (CN)

(72) Inventors: Zhaoyu Chen, Shanghai (CN); Xie Dai, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 298 days.

(21) Appl. No.: 16/491,241

(22) PCT Filed: Mar. 27, 2019

(86) PCT No.: PCT/CN2019/079927
§ 371 (c)(1),
(2) Date: Sep. 5, 2019

(87) PCT Pub. No.: WO2020/181585
PCT Pub. Date: Sep. 17, 2020

(30) Foreign Application Priority Data

Mar. 14, 2019 (CN) .......................... 201910193039.2

(51) Int. Cl.
*B60Q 1/115* (2006.01)
*F21S 41/657* (2018.01)
*B60Q 1/08* (2006.01)
*G01C 9/06* (2006.01)

(52) U.S. Cl.
CPC .............. *B60Q 1/115* (2013.01); *B60Q 1/085* (2013.01); *F21S 41/657* (2018.01); *G01C 9/06* (2013.01); *B60Q 2300/324* (2013.01)

(58) Field of Classification Search
CPC . F21S 41/657; B60Q 1/115; B60Q 2300/324; G01C 9/06
See application file for complete search history.

(56) References Cited

U.S. PATENT DOCUMENTS

| | | | | |
|---|---|---|---|---|
| 4,868,720 A | * | 9/1989 | Miyauchi | B60Q 1/115 362/466 |
| 10,953,787 B2 | * | 3/2021 | Bauch | B60Q 1/115 |

* cited by examiner

*Primary Examiner* — Robert J May
(74) *Attorney, Agent, or Firm* — Heslin Rothenberg Farley & Mesiti P.C.

(57) ABSTRACT

A vehicle headlight with automatic height adjustment, an automatic height adjusting method and a vehicle are provided. The vehicle headlight includes: an infrared spotlight configured to project infrared stripes onto a road surface to be traveled, the infrared stripes are formed by alternate bright and dark horizontal stripes; and the infrared stripes can form corresponding twisted stripes as profile of road surface varies; a camera configured to capture image information of the twisted stripes formed by the infrared stripes projected onto the profile of the road surface; an image processor in data connection with the camera, and configured to acquire the image information and generate a height adjustment command according to the image information; and a headlight module in data connection with the image processor, and configured to acquire the height adjustment command and adjust a headlight illumination height of the headlight module according to the height adjustment command.

20 Claims, 6 Drawing Sheets

VEHICLE HEADLIGHT WITH INFRARED SPOTLIGHT, AUTOMATIC HEIGHT ADJUSTMENT, AUTOMATIC HEIGHT ADJUSTING METHOD

CROSS-REFERENCE TO RELATED APPLICATIONS

This application is a National Stage Entry under 35 U.S.C. § 371 from Application No. PCT/CN2019/079927, filed on Mar. 27, 2019, which claims the priority to Chinese patent application No. 2019101930392, filed with the Chinese Patent Office (CNIPA) on Mar. 14, 2019 and entitled "Vehicle Headlight with Automatic Height Adjustment and Automatic Height Adjusting Method", which applications are incorporated herein by reference in their entireties.

TECHNICAL FIELD

The present disclosure relates to the field of automotive technology, and particularly to a vehicle headlight with automatic height adjustment, an automatic height adjusting method and a vehicle.

BACKGROUND ART

With the constant development of modern science and technology, more and more intelligent products appear in people's daily life. As a concentrated product of high technologies, vehicles become more and more intelligent. The technology content of vehicle headlights often represents the safety of the vehicles.

Headlight height being adjustable refers to the horizontal illumination height of the headlight being adjustable. However, some of the existing headlight adjustment techniques fail to have a pre-determination function, i.e., they cannot automatically adjust the headlight height to provide the driver with an optimum illuminated visual field by pre-determining the road conditions ahead the running vehicle.

SUMMARY

Objects of the present disclosure include, for example, providing a vehicle headlight with automatic height adjustment, an automatic height adjusting method and a vehicle, so as to alleviate the technical problem existing in the prior art that it is impossible to automatically adjust the headlight height by pre-determining the road conditions ahead the running vehicle.

Embodiments of the present disclosure may be implemented as follows:

An embodiment of the present disclosure provides a vehicle headlight with automatic height adjustment, comprising:

an infrared spotlight configured to project infrared stripes onto a road surface to be traveled, wherein the infrared stripes are formed by alternate bright and dark horizontal stripes; and the infrared stripes being can form corresponding twisted stripes in accordance with variation of a profile of the road surface;

a camera configured to capture image information of the twisted stripes formed by the infrared stripes projected onto the profile of the road surface;

an image processor in data connection with the camera, and configured to acquire the image information and generate a height adjustment command according to the image information; and a headlight module in data connection with the image processor, and configured to acquire the height adjustment command and adjust a headlight illumination height of the headlight module according to the height adjustment command.

Optionally, the image information includes a vertical height value and a width value of each stripe, so as to determine an uphill gradient of the road surface to be traveled by means of the vertical height value and the width value.

Optionally, the image information includes a break image, so as to determine, based on the break image, that the road surface to be traveled is a downhill road.

Optionally, the infrared spotlight comprises:

an infrared light configured as an infrared light source for projection;

a shutter (shade) structure provided thereon with a plurality of parallel strip-shaped light transmission holes and located at a projection outlet of the infrared light source; and a reflector (mirror) fitted in correspondence with the infrared light and configured to reflect the infrared rays projected by the infrared light onto the shutter structure so as to form the infrared stripes through the strip-shaped light transmission holes.

Optionally, the infrared light is an LED light.

Optionally, the shutter structure is a grating.

Optionally, the shutter structure comprises a frame and a plurality of shutter sheets disposed on the frame, wherein the plurality of shutter sheets are arranged in parallel so as to make gaps between adjacent shutter sheets form the strip-shaped light transmission holes.

Optionally, the vehicle headlight with automatic height adjustment further comprises:

a lens assembly comprising a lens holder and a lens; and wherein the lens is mounted at the projection outlet of the infrared light source by means of the lens holder, so that the infrared stripes are projected onto the road surface to be traveled via the lens.

Optionally, the shutter structure is located at a focal plane position of the lens.

Optionally, the vehicle headlight with automatic height adjustment further comprises:

a heat sink;

wherein the infrared light is disposed on the heat sink, and the heat sink is configured to dissipated heat from the infrared light.

Optionally, the infrared spotlight comprises:

an infrared light configured as an infrared light source for projection; and a shutter structure provided thereon with a plurality of parallel strip-shaped light transmission holes and located at a projection outlet of the infrared light source, so that the infrared rays projected by the infrared light directly hits the shutter structure so as to form the infrared stripes through the strip-shaped light transmission holes.

Optionally, the headlight module comprises a headlight body and a height adjustment actuator;

wherein the headlight body is in data connection with the height adjustment actuator;

the height adjustment actuator is in data connection with the image processor and configured to acquire the height adjustment command and adjust the headlight illumination height of the headlight body according to the height adjustment command.

Optionally, the headlight module is a low beam module, a high beam module or an integrated high and low beam module.

An embodiment of the present disclosure further provides an automatic height adjusting method for a vehicle headlight, implemented by the vehicle headlight with automatic height adjustment, comprising following steps of:

projecting infrared stripes onto a road surface to be traveled using an infrared spotlight, wherein the infrared stripes are formed by alternate bright and dark horizontal stripes; and the infrared stripes can form corresponding twisted stripes in accordance with variation of a profile of the road surface;

capturing, by a camera, image information of the twisted stripes formed by the infrared stripes projected onto the profile of the road surface;

acquiring, by an image processor, the image information and generating a height adjustment command according to the image information; and adjusting a headlight illumination height of the headlight module according to the height adjustment command.

An embodiment of the present disclosure further provides a vehicle, comprising the above-described vehicle headlight with automatic height adjustment.

Compared with the prior art, the advantageous effects of the embodiments of the present disclosure include, for example:

The vehicle headlight can project infrared stripes onto the road surface to be traveled during a traveling process of the vehicle, and when the infrared stripes hit the road surface to be traveled, the illuminated part of the road surface can diffuse the infrared rays, and as the profile or shape of the road surface varies, the infrared stripes are also modulated so that the shape of the infrared stripes is distorted and deformed, thereby forming twisted stripes corresponding to the road surface to be traveled in real time. The camera on the vehicle headlight will also capture in real time the pattern of the infrared stripes on the road surface, that is, capturing the twisted stripes that vary along with the profile or shape of the road surface, and the image processor will perform calculations on the twisted stripes projected onto the road surface that have been captured by the camera, thus the roughness of the road surface can be analyzed. After calculating the roughness of the road surface, the image processor will generate a height adjustment command and feed back the height adjustment command to the height adjustment actuator of the vehicle headlight in real time, then the height adjustment actuator can cause, in accordance with the height adjustment command, the headlight module to automatically adjust the height of the headlight according to the roughness of the road surface ahead the running vehicle, thereby achieving the object of self-adaptive height adjustment of the headlight and realizing the automatization of the height adjustment of the vehicle lights.

BRIEF DESCRIPTION OF DRAWINGS

In order to more clearly illustrate the technical solutions of the embodiments of the present disclosure, brief description is made below on the drawings required to be used in the embodiments. It should be understood that the following drawings only illustrate some of the embodiments of the present disclosure and shall not be regarded as a limitation on the scope, and for a person of ordinary skills in the art, other related drawings may be obtained based on these drawings without inventive effort.

Reference signs: 1—infrared spotlight; 2—camera; 3—image processor; 4—headlight module; 41—headlight body; 42—height adjustment actuator; 11—infrared light; 12—shutter structure; 121—frame; 122—shutter sheet; 123—strip-shaped light transmission hole; 13—reflector; 14—lens assembly; 141—lens holder; 142—lens; and 16—heat sink.

DETAILED DESCRIPTION OF EMBODIMENTS

In order to make the objects, technical solutions and advantages of the embodiments of the present disclosure clearer, the technical solutions of the embodiments of the present disclosure will be described clearly and completely below with reference to the drawings of the embodiments of the present disclosure. Apparently, the embodiments described are some of the embodiments of the present disclosure, rather than all of the embodiments. The components of the embodiments of the present disclosure described and illustrated in the drawings herein can generally be arranged and designed in a variety of different configurations.

Thus, the following detailed description of the embodiments of the present disclosure provided in the drawings is not intended to limit the scope of protection of the present disclosure, but is merely representative of the selected embodiments of the present disclosure. All the other embodiments that are obtained by a person of ordinary skills in the art without inventive effort on the basis of the embodiments of the present disclosure shall be covered by the scope of protection of the present disclosure.

It should be noted that like reference signs and letters denote like items in the following drawings, and therefore, once a certain item is defined in one figure, it does not need to be further defined or explained in the following figures.

In the description of the present disclosure, it is to be noted that the orientation or position relations denoted by the terms such as "center", "upper", "lower", "left", "right", "vertical", "horizontal", "inner" and "outer" are based on the orientation or position relations indicated by the figures, or refer to the orientations or positions where the product of the present disclosure is normally placed when in use, which only serves to facilitate describing the present disclosure and simplify the description, rather than indicating or implying that the device or element referred to must have a particular orientation, or must be constructed and operated in a particular orientation, and therefore cannot be construed as a limitation on the present disclosure.

In addition, the terms such as "first", "second" and "third" are only used for differentiated description and cannot be understood as an indication or implication of relative importance.

In addition, the terms such as "horizontal", "vertical" and "pendulous" do not necessarily require that the components must be absolutely horizontal or pendulous, rather, they can be slightly inclined. For example, the term "horizontal" merely refers to a more horizontal direction relative to the direction indicated by the term "vertical", and does not necessarily require that the structure must be absolutely horizontal, rather, it can be slightly inclined.

In the description of the present disclosure, it should be further noted that unless otherwise explicitly specified and defined, the terms such as "arrange", "install", "link" and "connect" shall be understood in broad sense, which may, for example, refer to fixed connection, detachable connection or integral connection; may refer to mechanical connection or electrical connection; may refer to direct connection or indirect connection by means of an intermediate medium; and may refer to internal communication between two elements. A person of ordinary skills in the art could understand the specific meaning of the terms in the present disclosure according to specific situations.

It should be noted that the features of the embodiments of the present disclosure can be combined with each other if there is no contradiction.

Nowadays, more and more models of vehicles have manual adjustment knobs in their interiors, which enable manual adjustment of the illumination height of headlights, and some high-grade luxury vehicles can even automatically adjust the height of their headlights by means of sensors. This function plays a certain role in driving safety, as the height of the vehicle lights may determine the driving safety of the driver as well as the safety of other people. The existing headlight height automatic adjustment system senses a change in the height of a vehicle body itself by height sensors on the vehicle body or wheels, so as to control the height of the headlights. However, this headlight adjustment technology is only limited to sensing the height of the vehicle body itself, and cannot serve a function of pre-determination. The present embodiment provides a vehicle headlight with automatic height adjustment, which can alleviate this technical problem.

Figure 1:
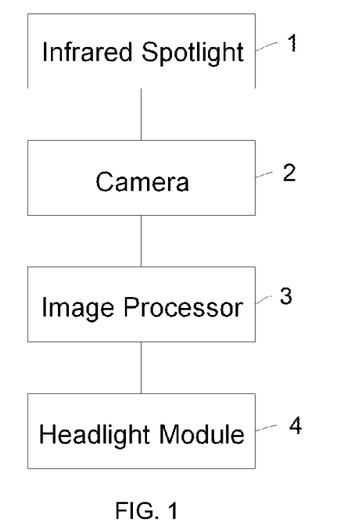
FIG. 1 is a schematic diagram of a circuit connection structure of a vehicle headlight according to an embodiment of the present disclosure.

As shown in FIG. 1 to FIG. 11, the present embodiment provides a vehicle headlight with automatic height adjustment, comprising:

an infrared spotlight 1 configured to project infrared stripes onto a road surface to be traveled, wherein the infrared stripes are formed by alternate bright and dark horizontal stripes; and the infrared stripes can form corresponding twisted stripes in accordance with variation of a profile of the road surface;

a camera 2 configured to capture image information of the twisted stripes formed by the infrared stripes projected onto the profile of the road surface;

an image processor 3, wherein the image processor 3 is in data connection with the camera 2, and is configured to acquire the image information and generate a height adjustment command according to the image information; and a headlight module 4, wherein the headlight module 4 is in data connection with the image processor 3, and is configured to acquire the height adjustment command and adjust a headlight illumination height of the headlight module 4 according to the height adjustment command.

It should be noted that the data connection referred to herein can also be understood as communication, and there are many ways to realize the connection, such as wireless connection or wired connection via a data cable. By means of the above-described structure, the vehicle headlight can project infrared stripes onto the road surface to be traveled during a traveling process of the vehicle, and when the infrared stripes hit the road surface to be traveled, the illuminated part of the road surface can diffuse the infrared rays, and as the profile or shape of the road surface varies, the infrared stripes are also modulated so that the shape of the infrared stripes are distorted and deformed, thereby forming twisted stripes in real time correspondence to the road surface to be traveled.

Moreover, the camera 2 on the vehicle headlight may also capture the pattern of the infrared stripes on the road surface in real time, that is, capturing the twisted stripes that vary along with the profile or shape of the road surface, and the image processor 3 may perform calculation (operation) on the twisted stripes projected onto the road surface that have been captured by the camera 2, thus a roughness (undulation) of the road surface can be analyzed. After calculating the roughness of the road surface, the image processor 3 may generate a height adjustment command and feed back the height adjustment command to a height adjustment actuator (which is a structure integrated in the headlight module 4) of the vehicle headlight in real time, then in accordance with the height adjustment command, the height adjustment actuator may cause, the headlight module 4 to automatically adjust the illumination height of the headlight according to the roughness of the road surface in front of the running vehicle, thereby achieving an object of self-adaptive height adjustment of the headlight and realizing an automatization of height adjustment of vehicle lights.

Optionally, the image information includes a vertical height value and a width value of each stripe, so as to determine an uphill gradient of the road surface to be traveled by means of the vertical height values and the width values.

Figure 7:
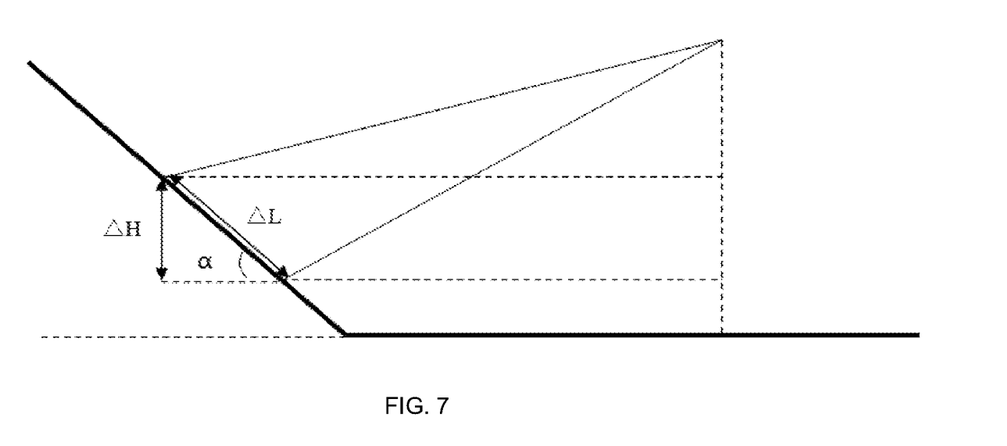
FIG. 7 is a schematic diagram of angle calculation of the infrared stripes according to an embodiment of the present disclosure.
Figure 8:
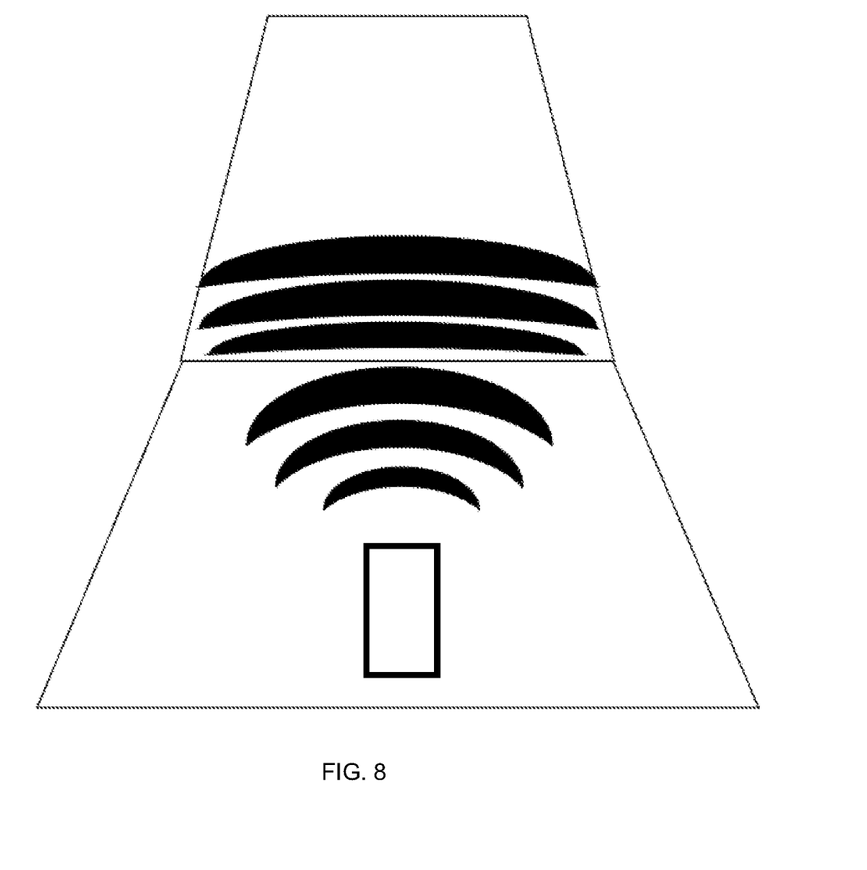
FIG. 8 is a schematic diagram of projection on an uphill road surface according to an embodiment of the present disclosure.
Figure 9:
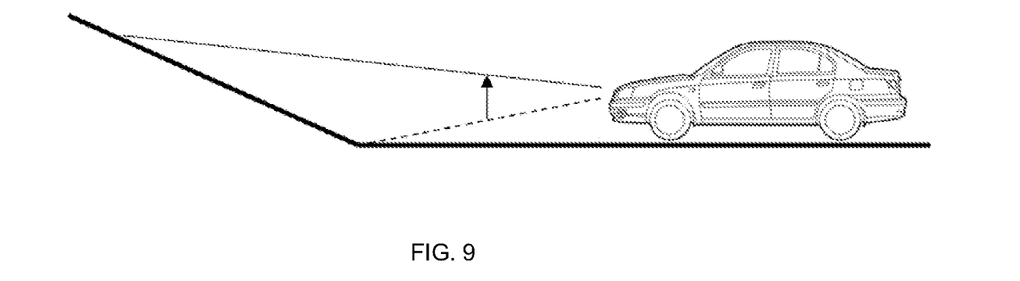
FIG. 9 is a side view of projection on the uphill road surface according to an embodiment of the present disclosure.
Figure 10:
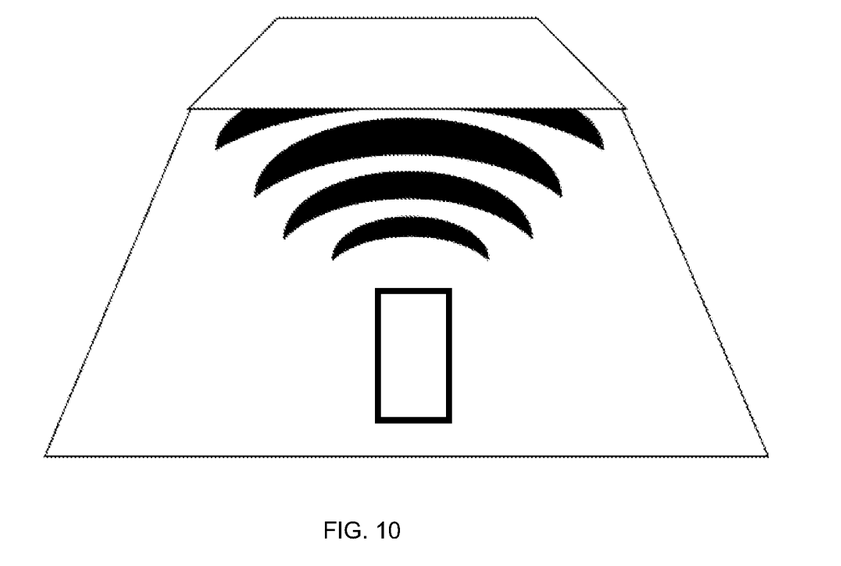
FIG. 10 is a schematic diagram of projection on a downhill road surface according to an embodiment of the present disclosure.
Figure 11:
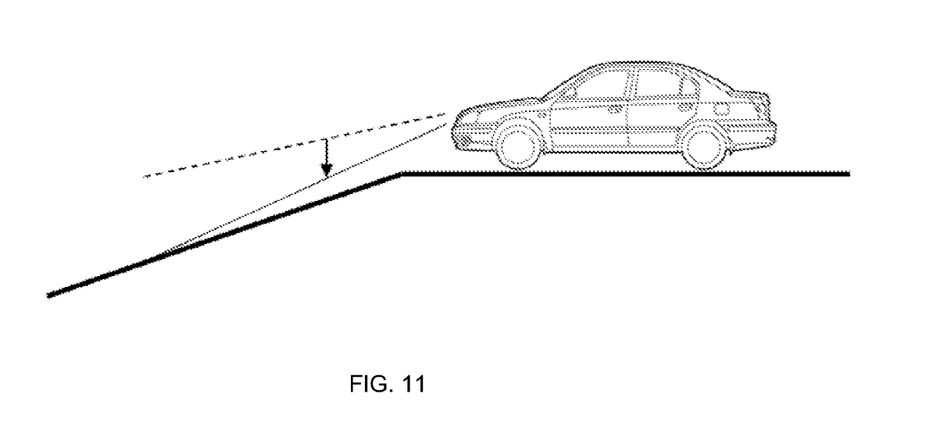
FIG. 11 is a side view of projection on the downhill road surface according to an embodiment of the present disclosure.

For example, as shown in FIGS. 7-11, when the headlight module 4 turns on the low beam mode, the camera 2 may monitor conditions of the road surface, i.e., monitoring the twisted stripes of the infrared rays projected onto the road surface to be traveled. As shown in FIG. 8, when infrared rays are projected onto the road surface to be traveled, they will be distorted and deformed. Based on a height difference $\Delta H$ between two bright stripes among the alternate bright and dark stripes of the infrared rays and a width difference $\Delta L$ between two bright stripes projected on the road surface to be traveled, the image processor 3 can obtain, by calculation, that the road surface ahead is an uphill road surface and the corresponding gradient thereof is $\alpha = \arcsin(\Delta H/\Delta L)$, which is one kind of the information contained in the image information, and is used for generating the height adjustment command. In FIG. 7, it can be understood that an area between the two straight lines corresponding to the ΔL is the area corresponding to the bright stripes, and the intersection point of the two straight lines is the position of the infrared spotlight 1. In FIG. 9, the change indicated by the arrow can be understood as a change in the position of illumination of the headlight, and the corresponding angle between the dotted line and the solid line is an angle θ1 by which the headlight is raised. In FIG. 11, the change indicated by the arrow can be understood as a change in the position of illumination of the headlight, and the corresponding angle between the dotted line and the solid line is the angle θ2 by which the headlight is lowered.

Thus, the image processor 3 can feed back the obtained gradient α to the height adjustment actuator, causing the headlight module 4 to raise the headlight height by θ1, so that the vehicle can automatically raise the height of the vehicle headlight by an angle in advance before traveling to an uphill road surface to enable the driver to obtain a better visual field for uphill driving at night.

Optionally, the image information includes a break image, so as to determine, based on the break image, that the road surface to be traveled is a downhill road.

When a downhill road is encountered, as shown in FIG. 10 and FIG. 11, breaks occur in the projection of the infrared stripes onto the road surface, because once a downhill road is encountered, some of the projected infrared stripes are projected onto the road surface to be traveled, and some cannot be projected onto the downhill road surface, so that breaks occur in the pattern of the infrared stripes, forming a break image. In this case, once a break image is formed, it evinces that a downhill road is encountered, thus a corresponding height adjustment command can be generated according to the break image, which command is used for controlling the headlight module 4 to adjust the illumination height of the headlight and lower the headlight, so that before the vehicle arrives at the downhill road surface, the vehicle headlight is automatically lowered by an angle in advance, to enable the driver to obtain a better visual field for downhill driving at night.

Figure 2:
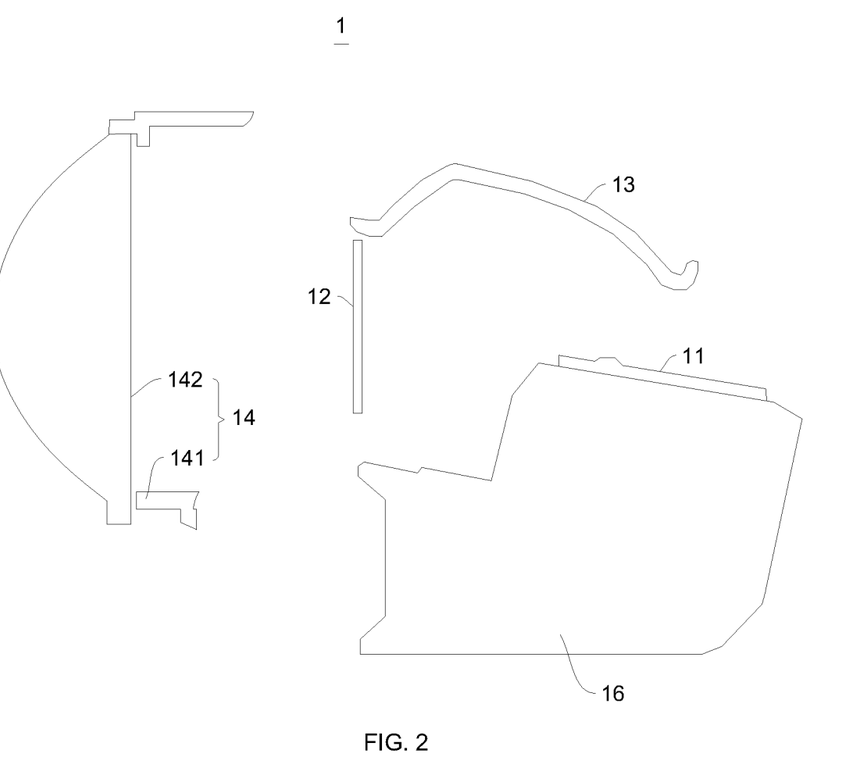
FIG. 2 is a plan exploded view of an infrared spotlight according to an embodiment of the present disclosure.
Figure 3:
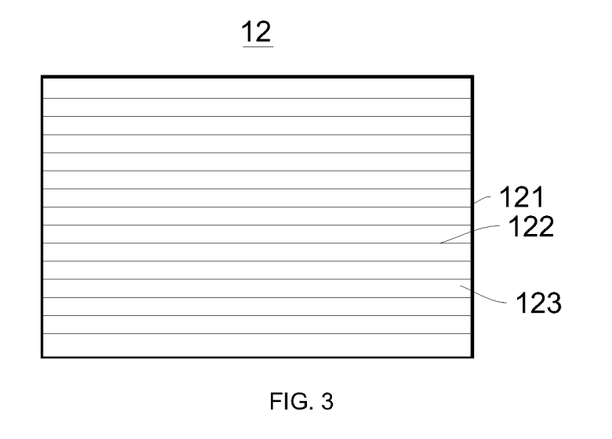
FIG. 3 is a structural diagram of a shutter structure according to an embodiment of the present disclosure.

Optionally, referring to FIG. 2 and FIG. 3, the infrared spotlight 1 comprises:

an infrared light 11 configured as an infrared light source for projection;

a shutter structure 12, wherein the shutter structure 12 is provided thereon with a plurality of parallel strip-shaped light transmission holes 123 located at a projection outlet of the infrared light source; and a reflector 13, wherein the reflector 13 is fitted in correspondence with the infrared light 11 and configured to reflect the infrared rays projected by the infrared light 11 onto the shutter structure 12 so as to form the infrared stripes through the strip-shaped light transmission holes 123.

As can be seen from the above, the infrared spotlight 1 can project infrared stripes onto the road surface to be traveled, and the infrared stripes are formed by alternate bright and dark horizontal stripes. The alternate bright and dark horizontal stripes of the infrared stripes can be formed by the shutter structure 12, wherein the shutter structure 12 is provided with a plurality of parallel strip-shaped light transmission holes 123 located at the projection outlet of the infrared light source. When projected onto the shutter structure 12, the infrared rays may pass through the strip-shaped light transmission holes, thereby forming the alternate bright and dark horizontal stripes after being projected out from the strip-shaped light transmission holes 123.

Moreover, during the projection, the infrared rays can also be projected by the infrared light 11 and reflected by the reflector 13 onto the shutter structure 12, thereby forming the alternate bright and dark horizontal stripes.

Optionally, the infrared spotlight 1 comprises:

an infrared light 11 configured as an infrared light source for projection;

a shutter structure 12, wherein the shutter structure 12 is provided with a plurality of parallel strip-shaped light transmission holes 123 and located at a projection outlet of the infrared light source, so that the infrared rays projected by the infrared light 11 directly hit the shutter structure 12 so as to form the infrared stripes through the strip-shaped light transmission holes 123.

It can be understood that, unlike the structure shown in FIG. 2, the infrared spotlight 1 may not be provided with the reflector 13, and infrared stripes can also be formed by the infrared light 11 irradiating the shutter structure 12 directly.

Optionally, the infrared light is an LED light, which has a small volume and a relatively long service life.

Optionally, the shutter structure 12 is a grating.

An optical device composed of a large number of parallel slits of equal width and at equal intervals is called grating. The commonly used grating is made by engraving a large number of parallel scores on a glass sheet, the scores are opaque portions, and a smooth portion between two scores can transmit light, which is equivalent to a slit (the slit can be understood as the strip-shaped light transmission hole 123 described above).

A crafted grating has thousands of or even tens of thousands of scores engraved within 1 cm width. Such a grating utilizing diffraction of transmission light is called a transmission grating; and there is also a grating using diffraction of reflection light between two scores, for example, numerous parallel scores are made on a surface coated with a metal layer, a smooth metal surface between two scores can reflect light, and this type of grating is called a reflection grating. Optionally, the shutter structure 12 comprises a frame 121 and a plurality of shutter sheets 122 disposed on the frame 121, wherein the plurality of shutter sheets 122 are arranged in parallel so as to make gaps between adjacent shutter sheets 122 form the strip-shaped light transmission holes 123.

It can be understood that the strip-shaped light transmission holes 123 may be formed by making numerous parallel strip-shaped holes in a plate, or may be formed by gaps between numerous shades arranged in parallel.

Therefore, the formation of the alternate bright and dark horizontal stripes can be realized by either one of the structure of the grating and the structure of the shutter sheets 122. In addition, the alternate bright and dark horizontal stripes may also be formed by light guide plates with light transmission at intervals formed by using a lens refraction structure. As to the specific structure thereof, there is no limitation.

Optionally, the vehicle headlight with automatic height adjustment further comprises:

a lens assembly 14, wherein the lens assembly 14 comprises a lens holder 141 and a lens 142; and the lens 142 is mounted at the projection outlet of the infrared light source by means of the lens holder 141, so that the infrared stripes are projected onto the road surface to be traveled via the lens 142.

Optionally, the shutter structure 12 is located at a focal plane position of the lens 142.

Optionally, the vehicle headlight with automatic height adjustment further comprises: a heat sink 16; and the infrared light 11 is disposed on the heat sink 16, wherein the heat sink 16 is configured to dissipate heat from the infrared light 11.

The heat sink 16 can be used for heat dissipation treatment of the whole equipment, especially for dissipating the heat emitted from the infrared light 11, so that the equipment may work in a state with balanced temperature, which prolongs the service life and ensures quality stability.

Figure 12:
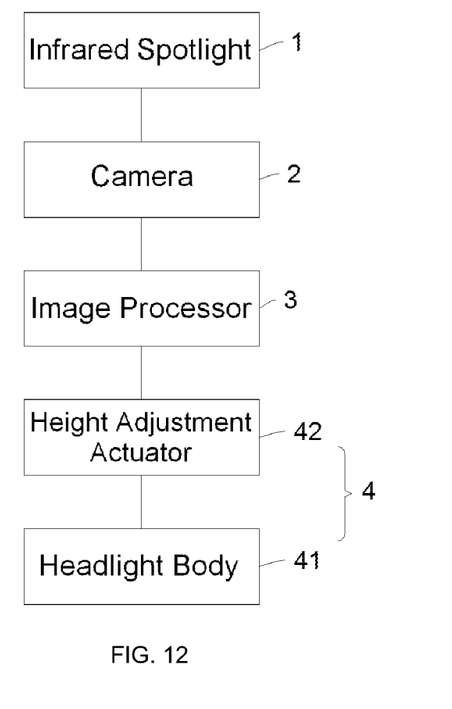
FIG. 12 is a schematic diagram of the circuit connection structure of another vehicle headlight according to an embodiment of the present disclosure.

Referring to FIG. 12, optionally, the headlight module 4 comprises a headlight body 41 and a height adjustment actuator 42;

wherein the headlight body 41 is in data connection with the height adjustment actuator 42; and the height adjustment actuator 42 is in data connection with the image processor 3 and configured to acquire the height adjustment command and adjust the headlight illumination height of the headlight body 41 according to the height adjustment command.

It can be understood that the headlight body 41 and the height adjustment actuator 42 may be integrated into one structure or may be two separate structures.

Optionally, the headlight module 4 is a low beam module, a high beam module or an integrated high and low beam module.

An embodiment of the present disclosure further provides an automatic height adjusting method for a vehicle headlight, implemented by the vehicle headlight with automatic height adjustment, comprising following steps of:

projecting infrared stripes onto a road surface to be traveled using an infrared spotlight 1, wherein the infrared stripes are formed by alternate bright and dark horizontal stripes; and the infrared stripes can form corresponding twisted stripes in accordance with variation of a profile of the road surface;

capturing, by a camera 2, image information of the twisted stripes formed by the infrared stripes projected onto the profile of the road surface;

acquiring, by an image processor 3, the image information and generating a height adjustment command according to the image information; and adjusting a headlight illumination height of the headlight module 4 according to the height adjustment command.

The automatic height adjusting method realizes the automatic adjustment by the structure of the vehicle headlight with automatic height adjustment, which is explained with the help of the following embodiment for the sake of clarity.

In the case where the road surface to be traveled ahead is an uphill road:

Referring to FIG. 8 and FIG. 9, the infrared light source of the infrared spotlight 1 emits infrared stripes (also corresponding to infrared lightwaves) which can be reflected onto the shutter structure 12 via the reflector 13, the infrared spotlight 1 of the vehicle is provided with the shutter structure 12 having strip-shaped light transmission holes 123. After passing through the shutter structure 12 and the lens 142, the infrared stripes turn to alternate bright and dark horizontal stripes, and are projected onto the road surface to form a light pattern of alternate bright and dark horizontal stripes, and the images of which are captured by the camera 2.

When the horizontal stripes hit the road surface ahead the running vehicle, the continuous infrared stripes may be distorted and deformed with the undulation of the road surface. The information such as the undulation of the road surface can be obtained by capturing in real time the pattern of the horizontal stripes on the road surface using the camera 2 and processing the stripe pattern using the image processor 3. Finally, the image processor 3 transmits the calculated road surface condition to the height adjustment actuator 42, so that the headlight module 4 can automatically adjust the headlight height according to the undulation condition of the road surface ahead of the running vehicle, thereby achieving the object of self-adaptive height adjustment of the headlight and realizing the automatization of height adjustment of the vehicle lights.

When the headlight module 4 turns on the low beam mode, the camera 2 may monitor the condition of the road surface, i.e., monitoring the twisted stripes of the infrared rays projected onto the road surface to be traveled. As shown in FIG. 8, when infrared rays are projected onto the road surface to be traveled, they will be distorted and deformed. Based on the height difference $\Delta H$ between two bright stripes among the alternate bright and dark stripes of the infrared rays and the width difference $\Delta L$ between two bright stripes projected on the road surface to be traveled, the image processor 3 can obtain, by calculation, that the road surface ahead is an uphill road surface and the corresponding gradient thereof is $\alpha = \arcsin(\Delta H/\Delta L)$, which is one kind of the information contained in the image information, and is used for generating the height adjustment command.

Thus, the image processor 3 can feed back the obtained gradient $\alpha$ to the height adjustment actuator 42, causing the headlight module 4 to raise the headlight height by $\theta 1$, so that the vehicle can automatically raise the vehicle headlight by an angle in advance before traveling to an uphill road surface to enable the driver to obtain a better visual field for uphill driving at night.

In the case where the road surface to be traveled ahead is a downhill road:

The infrared light source of the infrared spotlight 1 emits infrared stripes (also corresponding to infrared lightwaves) which can be reflected to the shutter structure 12 via the reflector 13, the infrared spotlight 1 of the vehicle is provided with the shutter structure 12 having strip-shaped light transmission holes. After passing through the shutter structure 12 and the lens 142, the infrared stripes turn to alternate bright and dark horizontal stripes, and are projected onto the road surface to form a light pattern of alternate bright and dark horizontal stripes, and images of which are captured by the camera 2.

When the horizontal stripes hit the road surface ahead the running vehicle, the continuous infrared stripes may be distorted and deformed with the undulation of the road surface. The information such as the undulation of the road surface can be obtained by capturing in real time the pattern of the horizontal stripes on the road surface using the camera 2 and processing the stripe pattern using the image processor 3. Finally, the image processor 3 transmits the calculated road surface condition to the height adjustment actuator 42, so that the headlight module 4 can automatically adjust the headlight height according to the undulation condition of the road surface ahead of the running vehicle, thereby achieving the object of self-adaptive height adjustment of the headlight and realizing the automatization of height adjustment of the vehicle lights.

When the headlight module 4 turns on the low beam mode, the camera 2 may monitor the condition of the road surface, i.e., monitoring the twisted stripes of the infrared rays projected onto the road surface to be traveled. As shown in FIG. 10, when infrared rays are projected onto the road surface to be traveled, break and disappearance of the infrared stripes on the downhill road surface may occur, and the image processor 3 can obtain, by calculation, that the road surface ahead is a downhill road surface and calculate a corresponding distance from the downhill road. The image processor 3 feeds back the same to the height adjustment actuator 42 so that the headlight module 4 lowers the headlight height by θ2, as shown in FIG. 11, the light pattern after traveling to a ramp is adjusted until it is consistent with the light pattern on a horizontal road surface. Hence, the headlight can be automatically lowered by an angle in advance before the vehicle arrives at the downhill road surface, to enable the driver to obtain a better visual field for downhill driving at night.

An embodiment of the present disclosure further provides a vehicle, comprising the above-described vehicle headlight with automatic height adjustment.

After equipped with the vehicle headlight with automatic height adjustment, the vehicle can realize automatic adjustment of the illumination height of the headlight.

In some embodiments:

Referring to FIG. 1, a vehicle headlight shown in FIG. 1 comprises an infrared spotlight 1, a camera 2, an image processor 3 and a headlight module 4; wherein the infrared spotlight 1 is configured to project infrared stripes onto a road surface to be traveled, the infrared stripes are formed by alternate bright and dark horizontal stripes, and the infrared stripes can form corresponding twisted stripes in accordance with variation of a profile of the road surface; the camera 2 is configured to capture image information of the twisted stripes formed by the infrared stripes projected onto the profile of the road surface; the image processor 3 is in data connection with the camera 2, and is configured to acquire the image information and generate a height adjustment command according to the image information; and the headlight module 4 is in data connection with the image processor 3, and is configured to acquire the height adjustment command and adjust a headlight illumination height of the headlight module 4 according to the height adjustment command.

Referring to FIG. 2, the infrared spotlight 1 shown in FIG. 2 comprises an infrared light 11, a shutter structure 12, a reflector 13, a lens assembly 14 and a heat sink 16; wherein the infrared light 11 is configured as an infrared light source for projection; the shutter structure 12 is located at a projection outlet of the infrared light source; the reflector 13 is fitted in correspondence with the infrared light 11 and is configured to reflect the infrared rays projected by the infrared light 11 onto the shutter structure 12 so as to form the infrared stripes; the lens assembly 14 comprises a lens holder 141 and a lens 142; the lens 142 is mounted at the projection outlet of the infrared light source by means of the lens holder 141, so that the infrared stripes are projected onto the road surface to be traveled via the lens 142; and the infrared light 11 is disposed on the heat sink 16.

Referring to FIG. 3, the shutter structure 12 shown in FIG. 3 comprises a frame 121 and a plurality of shutter sheets 122, wherein the plurality of shutter sheets 122 are arranged in parallel, strip-shaped light transmission holes 123 are formed between every two adjacent shutter sheets 122, and the reflector 13 reflects the infrared rays projected by the infrared light 11 onto the shutter structure 12 so as to form the infrared stripes through the strip-shaped light transmission holes 123.

Figure 4:
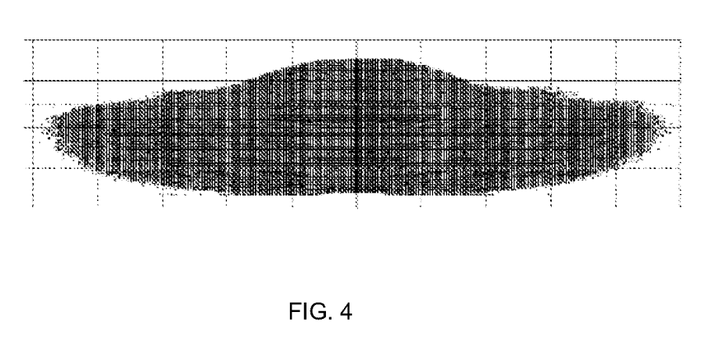
FIG. 4 is a structural diagram of a screen light pattern of the vehicle headlight according to an embodiment of the present disclosure.

Referring to FIG. 4, a screen light pattern of a vehicle headlight is shown in FIG. 4.

Figure 5:
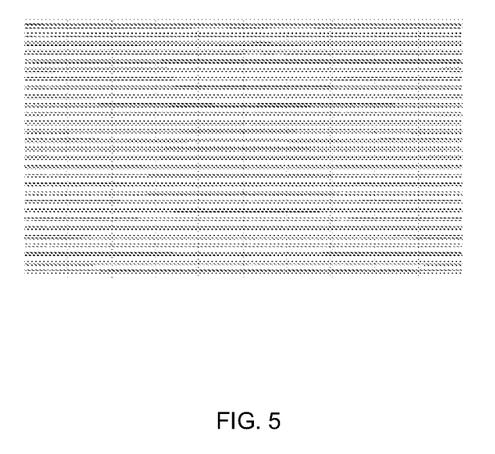
FIG. 5 is a partially enlarged view of the screen light pattern of the vehicle headlight according to an embodiment of the present disclosure.

Referring to FIG. 5, a partially enlarged view of the screen light pattern of the vehicle headlight is shown in FIG. 5.

Figure 6:
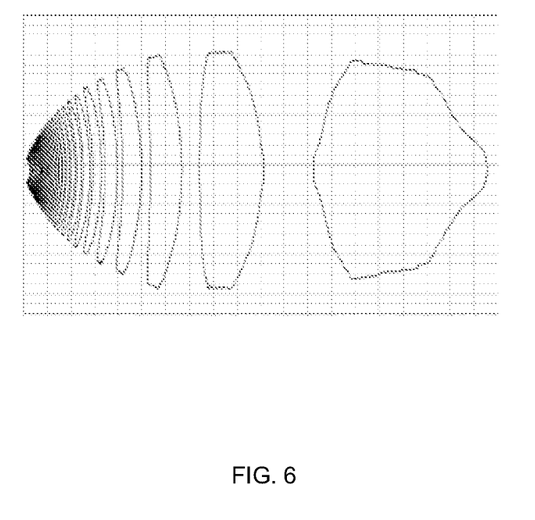
FIG. 6 is a structural diagram, at a vertically viewing angle, of infrared stripes according to an embodiment of the present disclosure.

Referring to FIG. 6, a structural diagram, at a vertically viewing angle, of infrared stripes is shown in FIG. 6.

Referring to FIG. 7, ΔH is a height difference between two bright stripes among the alternate bright and dark stripes in the infrared rays; ΔL is a width difference between two bright stripes projected on the road surface to be traveled; by the formula α=arcsin(ΔH/ΔL), it is possible to obtain, by calculation, that the road surface ahead is an uphill road surface and the corresponding gradient α thereof; and the area between the two straight lines corresponding to the ΔL is the area corresponding to the bright stripes, and an intersection point of the two straight lines is the position of the infrared spotlight 1.

Referring to FIG. 8 and FIG. 9, schematic diagrams of projection on an uphill road surface at different viewing angles are shown are shown in FIG. 8 and FIG. 9, wherein the change indicated by the arrow in FIG. 9 can be understood as a change in the position of illumination of the headlight, and the corresponding angle between the dotted line and the solid line is the angle θ1 at which the headlight is raised.

Referring to FIG. 10 and FIG. 11, schematic diagrams of projection on a downhill road surface at different viewing angles are shown in FIG. 10 and FIG. 11, wherein the change indicated by the arrow in FIG. 11 can be understood as a change in the position of illumination of the headlight, and the corresponding angle between the dotted line and the solid line is the angle θ2 at which the headlight is lowered.

Referring to FIG. 12, another vehicle headlight shown in FIG. 12 comprises an infrared spotlight 1, a camera 2, an image processor 3 and a headlight module 4; wherein the headlight module 4 comprises a height adjustment actuator 42 and a headlight body 41, the headlight body 41 is in data connection with the height adjustment actuator 42; the infrared spotlight 1 is configured to project infrared stripes onto a road surface to be traveled, the infrared stripes are formed by alternate bright and dark horizontal stripes, and the infrared stripes can form corresponding twisted stripes in accordance with variation of a profile of the road surface; the camera 2 is configured to capture image information of the twisted stripes formed by the infrared stripes projected onto the profile of the road surface; the image processor 3 is in data connection with the camera 2, and is configured to acquire the image information and generate a height adjustment command according to the image information; and the height adjustment actuator 42 is in data connection with the image processor 3 and is configured to acquire the height adjustment command and adjust the headlight illumination height of the headlight body 41 according to the height adjustment command.

Finally, it should be noted that the above embodiments are only used to illustrate the technical solutions of the present disclosure, rather than limiting the same; although the present disclosure has been described in detail with reference to the foregoing embodiments, it should be understood by a person of ordinary skills in the art that the technical solutions described in the embodiments can still be modified, or equivalent substitution can be made to some or all of the technical features therein; and the modification or substitution would not cause the substance of the corresponding technical solutions to depart from the scope of the technical solutions of the embodiments of the present disclosure.

INDUSTRIAL APPLICABILITY

In summary, the present disclosure provides a vehicle headlight with automatic height adjustment, an automatic height adjusting method and a vehicle, and can achieve the object of self-adaptive height adjustment of the headlight and realize the automatization of height adjustment of the vehicle lights.

The invention claimed is:

1. A vehicle headlight with automatic height adjustment, comprising:
   an infrared spotlight, configured to project infrared stripes onto a road surface to be traveled, wherein the infrared stripes are formed by alternate bright and dark horizontal stripes; and the infrared stripes can form corresponding twisted stripes in accordance with variation of a profile of the road surface;
   a camera, configured to capture image information of the twisted stripes formed by the infrared stripes projected onto the profile of the road surface;
   an image processor, in data connection with the camera, and configured to acquire the image information and generate a height adjustment command according to the image information; and
   a headlight module, in data connection with the image processor, and configured to acquire the height adjustment command and adjust a headlight illumination height of the headlight module according to the height adjustment command.

2. The vehicle headlight with automatic height adjustment according to claim 1, wherein the image information includes a vertical height value and a width value of each stripe, so as to determine an uphill gradient of the road surface to be traveled based on the vertical height value and the width value.

3. The vehicle headlight with automatic height adjustment according to claim 2, wherein the infrared spotlight comprises:
   an infrared light, configured as an infrared light source for projection;
   a shutter structure, provided thereon with a plurality of parallel strip-shaped light transmission holes and located at a projection outlet of the infrared light source; and
   a reflector, fitted in correspondence with the infrared light and configured to reflect, onto the shutter structure, infrared rays projected by the infrared light, so as to form the infrared stripes through the strip-shaped light transmission holes.

4. The vehicle headlight with automatic height adjustment according to claim 1, wherein the image information includes a break image, so as to determine, based on the break image, that the road surface to be traveled is a downhill road.

5. The vehicle headlight with automatic height adjustment according to claim 4, wherein the infrared spotlight comprises:
   an infrared light, configured as an infrared light source for projection;
   a shutter structure, provided thereon with a plurality of parallel strip-shaped light transmission holes and located at a projection outlet of the infrared light source; and
   a reflector, fitted in correspondence with the infrared light and configured to reflect, onto the shutter structure, infrared rays projected by the infrared light, so as to form the infrared stripes through the strip-shaped light transmission holes.

6. The vehicle headlight with automatic height adjustment according to of claim 1, wherein the infrared spotlight comprises:
   an infrared light, configured as an infrared light source for projection;
   a shutter structure, provided thereon with a plurality of parallel strip-shaped light transmission holes and located at a projection outlet of the infrared light source; and
   a reflector, fitted in correspondence with the infrared light and configured to reflect, onto the shutter structure, infrared rays projected by the infrared light, so as to form the infrared stripes through the strip-shaped light transmission holes.

7. The vehicle headlight with automatic height adjustment according to claim 6, wherein the infrared light is an LED light.

8. The vehicle headlight with automatic height adjustment according to claim 7, wherein the shutter structure is a grating.

9. The vehicle headlight with automatic height adjustment according to claim 7, wherein the shutter structure comprises a frame and a plurality of shutter sheets disposed on the frame, the plurality of shutter sheets are arranged in parallel so as to make gaps between adjacent shutter sheets form the strip-shaped light transmission holes.

10. The vehicle headlight with automatic height adjustment according to claim 7, further comprising:
    a lens assembly, comprising a lens holder and a lens,
    wherein the lens is mounted at the projection outlet of the infrared light source by means of the lens holder, so that the infrared stripes are projected onto the road surface to be traveled via the lens.

11. The vehicle headlight with automatic height adjustment according to claim 6, wherein the shutter structure is a grating.

12. The vehicle headlight with automatic height adjustment according to claim 6, wherein the shutter structure comprises a frame and a plurality of shutter sheets disposed on the frame, the plurality of shutter sheets are arranged in parallel so as to make gaps between adjacent shutter sheets form the strip-shaped light transmission holes.

13. The vehicle headlight with automatic height adjustment according to claim 6, further comprising:
    a lens assembly, comprising a lens holder and a lens,
    wherein the lens is mounted at the projection outlet of the infrared light source by means of the lens holder, so that the infrared stripes are projected onto the road surface to be traveled via the lens.

14. The vehicle headlight with automatic height adjustment according to claim 13, wherein the shutter structure is located at a focal plane position of the lens.

15. The vehicle headlight with automatic height adjustment according to claim 6, comprising:
    a heat sink,
    wherein the infrared light is disposed on the heat sink, and the heat sink is configured to dissipate heat from the infrared light.

16. The vehicle headlight with automatic height adjustment according to claim 6, wherein the infrared spotlight comprises:
    an infrared light, configured as an infrared light source for projection; and
    a shutter structure, provided thereon with a plurality of parallel strip-shaped light transmission holes and located at a projection outlet of the infrared light source, so that infrared rays projected by the infrared light directly hits the shutter structure so as to form the infrared stripes through the strip-shaped light transmission holes.

17. The vehicle headlight with automatic height adjustment according to claim 1, wherein the headlight module comprises a headlight body and a height adjustment actuator;

the headlight body is in data connection with the height adjustment actuator; and the height adjustment actuator is in data connection with the image processor and configured to acquire the height adjustment command and adjust the headlight illumination height of the headlight body according to the height adjustment command.

18. The vehicle headlight with automatic height adjustment according to claim 1, wherein the headlight module is a low beam module, a high beam module or an integrated high and low beam module.

19. A vehicle, comprising the vehicle headlight with automatic height adjustment according to claim 1.

20. An automatic height adjusting method for a vehicle headlight, which is implemented by the vehicle headlight with automatic height adjustment according to claim 1, the method comprising steps of:

projecting infrared stripes onto a road surface to be traveled using an infrared spotlight, wherein the infrared stripes are formed by alternate bright and dark horizontal stripes; and the infrared stripes can form corresponding twisted stripes in accordance with variation of a profile of the road surface;

capturing, by a camera, image information of the twisted stripes formed by the infrared stripes projected onto the profile of the road surface;

acquiring, by an image processor, the image information and generating a height adjustment command according to the image information; and adjusting a headlight illumination height of the headlight module through the height adjustment command.

* * * * *

UNITED STATES PATENT AND TRADEMARK OFFICE
CERTIFICATE OF CORRECTION

PATENT NO. : 11,161,451 B1
APPLICATION NO. : 16/491241
DATED : November 2, 2021
INVENTOR(S) : Chen et al.

Page 1 of 1

It is certified that error appears in the above-identified patent and that said Letters Patent is hereby corrected as shown below:

In the Claims

Column 14, Line 60: Claim 16, Delete "claim 6" and insert -- 1 --

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*